United States Patent Office 3,453,360
Patented July 1, 1969

3,453,360
UNIVERSALLY USEFUL STOCK MATERIAL FOR MANUFACTURING PLASTIC DOSAGE UNITS BY COMPRESSION TABLETING PROCESSES
Philip Melvin Hill, North Chicago, Ill., assignor to Abbott Laboratories, North Chicago, Ill., a corporation of Illinois
No Drawing. Filed Apr. 27, 1966, Ser. No. 545,562
Int. Cl. A61j 3/10; A61k 9/00, 27/00
U.S. Cl. 424—22
8 Claims

ABSTRACT OF THE DISCLOSURE

A sustained-release tableting medium of unlimited shelf life, produced by dispersing 10–100 parts of an insoluble, non-toxic, inert, inorganic salt in a solution of one part of a non-toxic, high-melting, film-forming, insoluble polymer in a volatile solvent and subsequently evaporating the solvent.

---

The present invention is directed to a tableting medium. More particularly, it is directed to a universal tableting medium which can be prepared separately and used for the preparation of all types of drugs intended for sustained release.

In the past numerous ways have been suggested and are used for the preparation of sustained-release pharmaceutical tablets. One of these methods requires the drug and a pharmaceutically acceptable coating material together with excipients and diluents to be granulated together before compressing the granules into the desired tablet shape. The disadvantage of that method is the requirement that the type and amount of the plastic must be carefully selected prior to granulation to provide the desired release pattern for the active ingredient.

Another method presently used consists in making granules of different solubilities, each granule containing a predetermined amount of a wax or plastic, active ingredient, and excipients. The mixture of the various granules is then placed in a capsule so that upon disintegration of the capsule material some of the individual granules provide fast action and some granules provide slow release effects. The disadvantages of this method include the necessity of providing different combinations of drug and wax for each type of granule required and the necessity to combine the fast-acting and slow-acting beads into a capsule.

Another prior art method used to provide sustained release consists in complexing the active ingredient with a release-controlling medium with the obvious disadvantage that for each drug a different complexing agent must be selected.

A further known method consists in combining the active drug with a homogeneous matrix consisting of a water-soluble and a water-insoluble material, the water-soluble ingredient being a waxy, fatty or liquid substance. The disadvantage of that method is that the tablet disintegrates at a set speed determined by the ratio of the water-soluble and the water-insoluble components of the matrix; however, as the tablet dissolves in the gastro-intestinal tract, the tablet becomes smaller and the active material generated from the tablet decreases in proportion to the ever-decreasing surface area of the shrinking tablet. A further disadvantage of that method is the use of the wax which is not desirable in today's high-speed tableting machines which generate a considerable amount of heat.

The major disadvantage of the methods mentioned above and other related methods consists in the necessity of preparing granules prior to compression, each granule containing a predetermined proportion of active drug and sustained-release material so that for each drug such granules must be prepared separately, or that a lipid, fatty or waxy material is required as part of the matrix, which requires a much more careful compression operation.

It is thus an object of the present invention to provide a tableting medium for preparing sustained-release tablets which can be prepared as a separate stock. It is another object of the present invention to provide a universally useful stock of a sustained-release material which can be used together with an active drug when and as needed. It is a further object of the present invention to provide a universally useful sustained-release powder or granule of substantially indefinite shelf-life. Another object of the present invention is the provision of a powdered or granulated sustained-release medium which, when combined with an active drug, can be immediately compressed into pharmaceutical tablets of any desired shape.

These and related objects are accomplished by the present invention in providing a dry, powdered or granulated component for sustained-release pharmaceutical tablets consisting essentially of 10–100 parts of finely-divided, insoluble, non-toxic, inert, non-hygroscopic, inorganic salt particles coated with one part of a non-toxic, insoluble, high-melting, film-forming polymeric material. The method of preparing this universally applicable sustained-release medium comprises intimately dispersing 10–100 parts of the above-defined inorganic salt in a solution of one part of the above-defined polymeric material dissolved in a volatile solvent for said polymeric material, evaporating said organic solvent, and breaking up any agglomerates of the resulting dry powder into finely-divided particles. If desired, the particles so prepared can be used in that form and stored until needed, or they may be converted into granules by passing the still moist mixture through a screen or similar known methods. Surprisingly, the new medium does not require a water-soluble component. This discovery enables the preparation of a medium devoid of any waxy or low-melting polymer which ultimately makes tableting considerably easier.

The above reference to "inert" is meant to indicate that the material so defined has no adverse effect on the other component in the new sustained-release medium or on the drug with which it is to be combined; the use of the term "high-melting" above is meant to designate that the polymeric material has a softening point above 100° C. so that no deterioration of this material occurs in a high-speed tableting machine. The term "insoluble" used above is to be understood as expressing the insolubility of the material in water and in the liquids of the gastric and intestinal tracts. The film-forming polymer, used only in relatively very small amounts may, however, be slightly soluble in the intestinal juices because when it is combined with the inorganic salt, the relatively short residence in the intestines will not destroy the matrix in that case.

In a simple embodiment, calcium sulfate is placed in a mixing device and a solution of a suitable film-forming polymer of the above-defined class in a volatile organic solvent is added to the calcium sulfate. The mixture is homogenized while permitting the organic solvent to evaporate. The resulting mixture is dried thoroughly and subsequently passed through a screen to break up any lumps. This material may be used in the finely-divided form so obtained or it may be converted into granules by known techniques. The amount of the film-forming polymer may be between 1 and 10% of the inorganic salt; a preferred range is between 1 and 3%. No advantage is gained by using larger amounts of the usually more costly polymeric binder. Surprisingly, the amount of the polymer does not affect the sustained-release pattern when this mixture is compressed with granules of an active drug. However, a minimum of about 1% of the polymer should be used to provide sufficient coherence in the tableting process.

The new sustained-release material so prepared does not leach out in water during an 8-hour period, does not disintegrate or split during leach, compresses without binding, sticking, capping or splitting when properly lubricated in the customary tableting process and, with proper selection of the inorganic salt and the polymer, the compressed mixture is sufficiently hard to be nonchewable. Preferably, the ingredients are so selected that the resulting mixture is white.

Suitable film-forming polymers include polypropylene, polyvinylacetate, carboxylated copolymer of vinyl acetate and crotonic or acrylic acid, polyacrylonitrile, cellulose-acetate-phthalate, ethylcellulose, cellulose acetate or butyrate, copolymers of maleic anhydride and ethylene, copolymers of methylmethacrylate and methacrylic acid, copolymers of methylacrylate and methylmethacrylate, polymethylstyrene, methylmethacrylate, polyvinylchloride, and polymethylstyrene modified with acrylonitrile and mixtures or copolymers thereof. Similar polymer mixtures and copolymers are equally suitable if they satisfy the above definition and if they are sufficiently soluble in a volatile organic solvent for the above-described blending operation for preparing the new sustained-release medium. Suitable organic solvents are methylene chloride, chloroform, acetone, ethyl acetate, ethyl ether, dipropyl ether, benzene, methanol, ethanol and mixtures thereof.

Suitable inorganic salts included in the above definition are calcium carbonate, hydrous calcium phosphate, dibasic calcium phosphate, calcium sulfate, talcum powder, bentonite, alumina, magnesium trisilicate, silicic acid, terra alba, etc. Among those named, calcium sulfate is preferred since it provides an excellent release pattern, is inexpensive, white, and easily available in pharmaceutically pure form.

Upon compressing the new sustained-release medium with the active drug, tablets of any desired shape can be prepared. The drug release can be predetermined by properly selecting the ratio between drug and matrix: a larger proportion of matrix material provides a slower release for the active drug and conversely. The amount of drug in a tablet prepared in this manner should be between 0.5 and 35% and, depending on this proportion and the solubility of the drug incorporated, the release of the drug in the gastro-intestinal tract is substantially constant over a period of from between 4 to 24 hours. Obviously, other excipients can be added to the mixture of the new matrix and the desired drug, e.g. coloring agents, flavoring agents, buffers, diluents, etc. The addition of a lubricant such as magnesium stearate, in an amount of from 0.5 to 5% based on the weight of the total tablet prepared is usually required according to standard tableting techniques.

To better understand the processes of preparing the universally useful sustained-release matrix of the present invention, reference is made to the following examples which are illustrations only.

EXAMPLE 1

Ingredients:
Calcium sulfate _____gm__ 100
Carboxylated copolymer of vinyl acetate and a minor amount of crotonic acid (sold as Gelva C3-V30 by Shawinigan Resins Co.) _____gm__ 2
Methylene chloride _____ml__ 40

The copolymer is dissolved in methylene chloride and the solution is slowly added to the calcium sulfate under agitation. Agitation is continued until the material becomes a flowable powder again. The thus obtained polymer-coated calcium sulfate is dried at 50° C. to strip all remains of the solvent. After passing the mixture through a 20-mesh screen to break up any lumps it is ready as a universally applicable medium for the preparation of sustained-release tablets. It can be stored as such until needed or it can be granulated.

EXAMPLES 2-4

In the manner described in Example 1, the following matrices are prepared with the following ingredients:

(2)
Calcium sulfate _____gm__ 100
Polyvinylacetate _____gm__ 2
Methylene chloride _____ml__ 40

(3)
Calcium sulfate _____gm__ 100
Methylacrylate/methylmethacrylate copolymer gm__ 2
Acetone _____ml__ 40

(4)
Calcium phosphate, hydrous _____gm__ 100
Carboxylated copolymer of vinyl acetate of Example 1 _____gm__ 2
Methylene chloride _____ml 40

EXAMPLE 5

This example illustrates a tablet of desoxyephedrine hydrochloride with the release sustained over a period of 7 hours.

Ingredients: Mg./tablet
Desoxyephedrine HCl _____ 10.0
Calcium sulfate (sustained-release matrix prepared according to Example 1) _____ 188.0
Magnesium stearate _____ 2.0

The three items are passed throguh a 40-mesh screen, blended and compressed into ⁹⁄₃₂-inch tablets, each tablet weighing 200 mg. Twelve of these tablets are put into each of three bottles containing 300 ml. of water at pH 7, 7.5 and 1.2 and the bottles are rolled for 7 hours at room temperature. An additional test is run in the same manner in water of 40° C. and pH 7. A 10 ml. sample is withdrawn from each bottle at periodic intervals and assayed for content of desoxyephedrine HCl. The results shown in the following table indicate the total percentage of drug found in the liquid:

| Time, hr. | 25° C., pH 7, percent | 40° C., pH 7, percent | 25° C., pH 7.5, percent | 25° C., pH 1.2, percent |
|---|---|---|---|---|
| ½ | 27.1 | 27.9 | 17.7 | 29.4 |
| 1 | 37.1 | 41.8 | 24.8 | 43.1 |
| 4 | 61.2 | 84.9 | 53.6 | 77.5 |
| 7 | 75.2 | 98.8 | 68.6 | 91.6 |

The corresponding values obtained by following the procedure involving the disintegration basket described in the United States Pharmacopoeia are 30.3%, 42.8%, 70.7% and 86.2% respectively.

EXAMPLE 6

To demonstrate the above in vitro release pattern in vivo, one tablet prepared according to Example 5 is administered to each of six rabbits. Two rabbits each were sacrificed at 1 hr., 3 hrs., and 6 hrs., and the tablets recovered from the intestines were analyzed for the remaining desoxyephedrine HCl.

| Time, hr. | Rabbit No. | Desoxyephedrine HCl found (mg./tab.) | Percent theory | Percent release (100-percent found) |
|---|---|---|---|---|
| 1 | 1 | 6.47 | 64.7 | 35.3 |
|   | 2 | 6.59 | 65.9 | 34.1 |
| 3 | 1 | 3.68 | 36.8 | 63.2 |
|   | 2 | 4.07 | 40.7 | 59.3 |
| 6 | 1 | 1.22 | 12.2 | 87.88 |
|   | 2 | 1.83 | 18.3 | 81.7 |

EXAMPLE 7

The procedure of Example 5 is followed to make tablets containing 100 mg. per tablet of sodium pentobarbital, 187 mg. per tablet of the sustained-release medium of Example 1, and 3 mg. per tablet of magnesium stearate.

The "rolling bottle" test shows the following results with this tablet and with one prepared in identical fashion but containing only 50 mg. of drug per tablet, 123 mg. per tablet of the sustained-release medium and 2 mg. per tablet of magnesium stearate.

| Time, hr. | 50 mg. tablet, percent drug | 100 mg. tablet, percent drug |
|---|---|---|
| ½ | 32.7 | 31.7 |
| 1 | 46.6 | 43.7 |
| 4 | 80.4 | 62.5 |
| 7 | 93.5 | 95.2 |

The table shows that the release in both tablets is spread over a period of more than 7 hrs.; one tablet contains 34%, the other contains 28% of the active drug and the tablets are of different total weight.

As will be seen from the above examples, the present invention provides a tableting medium which is universally applicable for the preparation of sustained-release tablets in combination with any solid drug. The new matrix material can be stored practically indefinitely in the form of granules or as a powder. Combining this medium with an active drug involves nothing more than dry blending the active ingredient and the new medium and compressing the homogeneous mixture to any desired tablet shape.

Tablets prepared in this manner travel through the intestinal tract substantially without deterioration of their shape while the active ingredient leaches out of the tablet in a sustained-release pattern. The release pattern can be modified at will by incorporating more or less of the active drug or, expressed differently, for a given amount of active drug, release can be prolonged by providing larger tablets. For instance, tablets weighing 200, 400 and 600 mg. each containing 10 mg. of desoxyephedrine HCl show a decreasing rate of drug release while, surprisingly, increasing the amount of polymer or the addition of another soluble ingredient, or using different particle size fractions of the medicament produces no significant effect on the leach rate. Of course, tablets prepared in the above-described manner may contain more than one active ingredient.

It will also be apparent from the above examples that the new matrix material can be prepared very inexpensively since the major proportion of this matrix is an inexpensive inorganic salt such as calcium sulfate and the like. In addition, a significant advantage is gained by avoiding the necessity of custom-blending the matrix in different fashion for each medicament intended for sustained release for human or animal consumption. Furthermore, the new sustained-release material can be stored almost indefinitely under suitable conditions.

Others may practice the invention in any of the numerous ways which will be apparent to one skilled in the art by the present disclosure. All such practice of the invention is considered a part hereof provided it falls within the scope of the appended claims.

I claim:

1. In the method of preparing a sustained-release tablet the improvement which consists of the steps of intimately dispersing 10–100 parts of a finely-divided calcium sulfate or other insoluble, non-toxic, inert, non-hygroscopic, inorganic salts, in a solution of one part of a non-toxic, high-melting, film-forming, insoluble polymeric material selected from the group consisting of polypropylene, polyvinylacetate, carboxylated copolymer of vinyl acetate and crotonic or acrylic acid, polyacrylonitrile, cellulose-acetate-phthalate, ethylcellulose, cellulose acetate or butyrate, copolymers of maleic anhydride and ethylene, copolymers of methylmethacrylate and methacrylic acid, copolymers of methylacrylate and methylmethacrylate, polymethylstyrene, methylmethacrylate, polyvinylchloride, and polymethylstyrene modified with acrylonitrile and mixtures and copolymers thereof, dissolved in a volatile organic solvent for said polymeric material, evaporating said organic solvent, and breaking up any agglomerates of the resulting dry powder into finely-divided tableting medium stock material particles of substantially unlimited shelf-life which can be stored until needed, dry-blending the active ingredient therewith when and as needed, and compressing the homogeneous mixture into tablet form.

2. The process of claim 1 wherein said inorganic salt is calcium sulfate.

3. The process of claim 1 wherein said polymeric material is a carboxylated copolymer of vinyl acetate.

4. The process of claim 1 wherein the obtained dry powder is granulated prior to the addition of the active ingredient.

5. A finely-divided composition in homogeneous, dry-blended mixture with active ingredients in sustained-release pharmaceutical tablets consisting essentially of 10–100 parts of finely-divided calcium sulfate or other insoluble, non-toxic, inert, non-hygroscopic, inorganic salt particles coated in accordance with the method of claim 1 with one part of a non-toxic, insoluble, high-melting, film-forming polymeric material selected from the group consisting of polypropylene, polyvinylacetate, carboxylated copolymer of vinyl acetate and crotonic or acrylic acid, polyacrylonitrile, cellulose-acetate-phthalate, ethylcellulose, cellulose acetate or butyrate, copolymers of maleic anhydride and ethylene, copolymers of methylmethacrylate and methacrylic acid, copolymers of methylacrylate and methylmethacrylate, polymethylstyrene, methylmethacrylate, polyvinylchloride, and polymethylstyrene modified with acrylonitrile and mixtures and copolymers thereof.

6. The finely-divided composition of claim 5 wherein said inorganic salt is calcium sulfate.

7. The finely-divided composition of claim 5 wherein said polymeric material is a carboxylated copolymer of vinyl acetate.

8. The composition of claim 5 in the form of granules.

References Cited

UNITED STATES PATENTS

| 2,987,445 | 6/1961 | Levesque | 167—82 |
| 3,079,303 | 2/1963 | Raff et al. | 167—82 |
| 3,087,860 | 4/1963 | Endicott | 167—82 |
| 3,317,394 | 5/1967 | Fryklof et al. | 167—82 |

LEWIS GOTTS, Primary Examiner.

S. K. ROSE, Assistant Examiner.

U.S. Cl. X.R.

106—193, 288, 306, 308; 117—54, 100, 123, 161, 166; 161—411; 264—123; 424—23, 32, 33, 35, 78, 81, 83, 357, 358, 362